United States Patent
Wells

(10) Patent No.: US 8,161,185 B2
(45) Date of Patent: Apr. 17, 2012

(54) METHOD AND APPARATUS FOR ASSIGNING IPV6 LINK STATE IDENTIFIERS

(75) Inventor: Paul William Wells, Eden Prairie, MN (US)

(73) Assignee: Cisco Technology, Inc., San Jose, CA (US)

(*) Notice: Subject to any disclaimer, the term of this patent is extended or adjusted under 35 U.S.C. 154(b) by 639 days.

(21) Appl. No.: 11/410,416

(22) Filed: Apr. 24, 2006

(65) Prior Publication Data

US 2007/0250640 A1    Oct. 25, 2007

(51) Int. Cl.
G06F 15/173 (2006.01)
G06F 15/16 (2006.01)
H04L 12/28 (2006.01)
H04L 12/58 (2006.01)

(52) U.S. Cl. ........ 709/238; 709/239; 709/245; 370/389; 370/400; 370/401

(58) Field of Classification Search .......... 709/228, 709/238; 370/235, 238, 255, 351, 352, 389, 370/400, 401; 707/6
See application file for complete search history.

(56) References Cited

U.S. PATENT DOCUMENTS

| | | | |
|---|---|---|---|
| 6,473,421 B1* | 10/2002 | Tappan | 370/351 |
| 6,603,756 B1* | 8/2003 | Tappan | 370/351 |
| 6,741,585 B1* | 5/2004 | Munoz et al. | 370/352 |
| 6,792,423 B1* | 9/2004 | Jeffries et al. | 1/1 |
| 7,010,607 B1* | 3/2006 | Bunton | 709/228 |
| 7,031,320 B2* | 4/2006 | Choe | 370/395.31 |
| 7,047,453 B2* | 5/2006 | Lappin, Jr. | 714/52 |
| 7,054,311 B2* | 5/2006 | Norman et al. | 370/378 |
| 7,155,500 B2* | 12/2006 | Nikander | 709/223 |
| 7,200,122 B2* | 4/2007 | Goringe et al. | 370/255 |
| 7,277,386 B1* | 10/2007 | Ferguson et al. | 370/230 |
| 7,325,059 B2* | 1/2008 | Barach et al. | 709/225 |
| 7,376,122 B2* | 5/2008 | Draves et al. | 370/351 |
| 7,383,244 B2* | 6/2008 | Bass et al. | 707/1 |
| 7,418,505 B2* | 8/2008 | Lim et al. | 709/226 |
| 7,567,577 B2 | 7/2009 | Thubert | |
| 2002/0103631 A1* | 8/2002 | Feldmann et al. | 703/22 |
| 2002/0118682 A1* | 8/2002 | Choe | 370/395.31 |
| 2003/0023701 A1* | 1/2003 | Norman et al. | 709/214 |
| 2003/0026268 A1* | 2/2003 | Navas | 370/400 |
| 2003/0043820 A1* | 3/2003 | Goringe et al. | 370/400 |
| 2003/0218988 A1* | 11/2003 | Han et al. | 370/254 |

(Continued)

OTHER PUBLICATIONS

Coltun, R., "OSPF for IPv6," Request for Comments (RFC) 2740, Dec. 1999, 80 pages.

(Continued)

*Primary Examiner* — Philip Chea
*Assistant Examiner* — Tae Kim
(74) *Attorney, Agent, or Firm* — Cesari and McKenna, LLP

(57) ABSTRACT

In one embodiment, a technique is used by a routing system to generate a link state identifier for a link state advertisement message. The routing system generates the link state advertisement message. A prefix length is read from the link state advertisement message. Further, a prefix is read from the link state advertisement message. A hash function is performed on the prefix and the length to produce a result by appending the length to the prefix to generate a combined value, inputting the combined value to a hash algorithm, and using at least a portion of an output of the hash algorithm as the result. The link state identifier is determined from the result of the hash function.

22 Claims, 3 Drawing Sheets

U.S. PATENT DOCUMENTS

| | | | |
|---|---|---|---|
| 2004/0013113 A1* | 1/2004 | Singh et al. | 370/389 |
| 2004/0039839 A1* | 2/2004 | Kalyanaraman et al. | 709/238 |
| 2004/0042463 A1* | 3/2004 | Guerrero et al. | 370/395.31 |
| 2004/0120355 A1* | 6/2004 | Kwiatkowski | 370/506 |
| 2004/0230696 A1* | 11/2004 | Barach et al. | 709/238 |
| 2004/0246902 A1* | 12/2004 | Weinstein et al. | 370/238 |
| 2004/0249976 A1* | 12/2004 | Neustadter et al. | 709/245 |
| 2004/0255045 A1* | 12/2004 | Lim et al. | 709/245 |
| 2005/0249206 A1* | 11/2005 | Wybenga et al. | 370/389 |
| 2006/0005014 A1* | 1/2006 | Aura et al. | 713/162 |
| 2006/0013125 A1* | 1/2006 | Vasseur et al. | 370/217 |
| 2006/0056328 A1* | 3/2006 | Lehane et al. | 370/315 |
| 2006/0126502 A1* | 6/2006 | Vasseur et al. | 370/221 |
| 2006/0239275 A1* | 10/2006 | Zlateff et al. | 370/400 |
| 2006/0291391 A1* | 12/2006 | Vasseur et al. | 370/235 |
| 2007/0008949 A1* | 1/2007 | Balandin | 370/351 |
| 2007/0025346 A1* | 2/2007 | Kecskemeti | 370/389 |
| 2007/0047469 A1* | 3/2007 | Vasseur et al. | 370/255 |
| 2007/0189284 A1* | 8/2007 | Kecskemeti | 370/389 |
| 2007/0206501 A1* | 9/2007 | Alesi et al. | 370/235 |
| 2007/0245034 A1* | 10/2007 | Retana et al. | 709/238 |

OTHER PUBLICATIONS

OSPF Design Guide, Document ID 7039, Cisco Systems, Inc., Aug. 10, 2005, 53 pages.

* cited by examiner

METHOD AND APPARATUS FOR ASSIGNING IPV6 LINK STATE IDENTIFIERS

FIELD OF THE INVENTION

This invention relates to routing systems. Still more particularly, this invention relates to link state advertisements transmitted by routing systems. Still more particularly, this invention relate to a manner in which a link state identifier is generated for a link state advertisement by a routing system.

PRIOR ART

In a router system operating using an Open Shortest Path First (OSPF) protocol supporting Internet Protocol version 6 (Ipv6), type 3, 5, and 7 link state advertisements are used to determine connections between router systems in the network for use in determining transmission paths for data transmitted between the router systems. A router system stores link state advertisements received from other router systems. The stored link state advertisements are then used to determine the paths used for transmitting data to other routing systems.

In many prior art systems, a counter is used to provide the link state identifier for the link state advertisements. The use of a counter to generate the link state identifiers can cause a problem when a routing system has a planned or unplanned restart. It is a problem because the counter resets to zero and the link state advertisements sent may not be in the same order and/or may cause other problems when stored in the databases of other routing systems. Thus, there is a need in the art for a new manner of assigning link state identifiers to prevent the problem of duplicate and/or invalid link state advertisements being stored in a database of other routing systems.

BRIEF DESCRIPTION OF THE DRAWINGS

The above and other advantage and features of this invention are described in the following Detailed Description and are shown in the following drawings.

DETAILED DESCRIPTION

Figure 1:
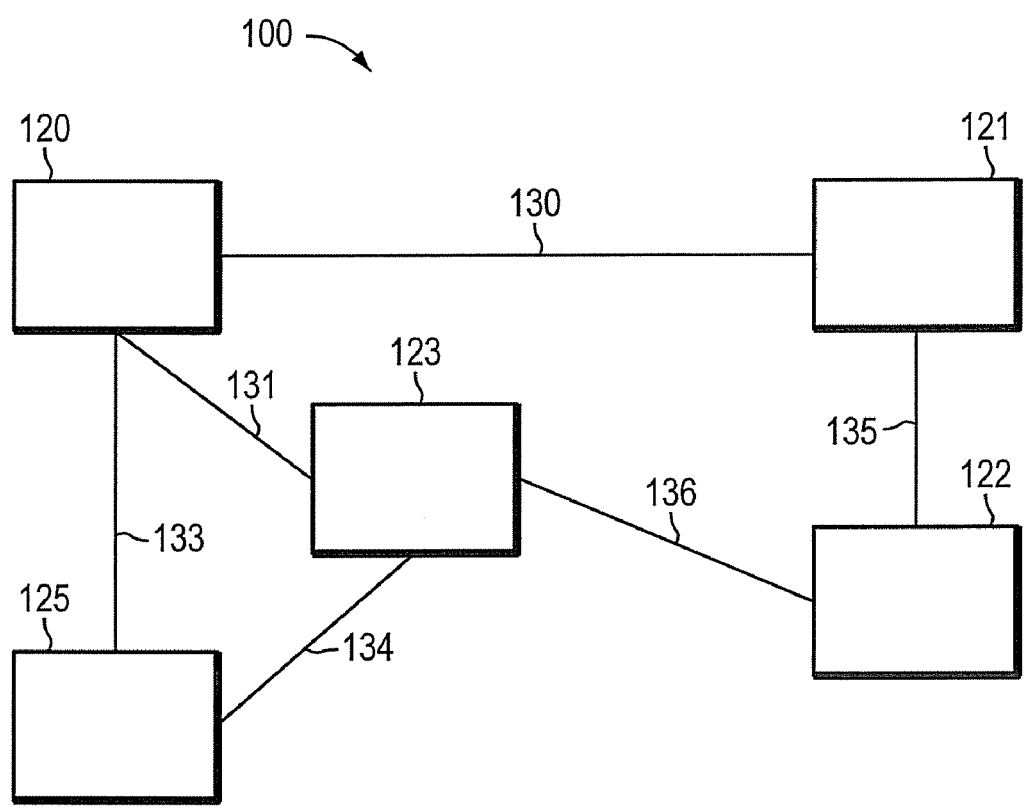
FIG. 1 illustrating a diagram of a network that includes routing systems that generate link state identifiers in accordance with the present invention.

This invention relates to providing a system in a routing operating system that generates link state identifiers for a link state advertisement used in Open Shortest Path First (OSPF) protocol. In the following disclosure, the same reference numeral is used for a component shown in different figures.

FIG. 1 illustrates a network 100 including router systems 120-125 that operate the OSPF protocol supporting Internet Protocol version 6 (Ipv6) in a preferred embodiment of this invention. One skilled in the art will recognize that this invention may apply to any system in which OSPF protocol is used. Router systems 120-125 are connected via communication paths 130-136. One skilled in the art will recognize that the number of router systems and communication paths are arbitrary and the exact configuration of a network is left to those skilled in the art designing the network.

In network 100, some routers are directly connected, such as router system 120 being directly connected to router system 121 via communication path 130. While other router systems may be indirectly connected, such as router systems 120 and 122 which are connected through router system 121 via paths 130 and 135 or through router system 123 via paths 131 and 136. To determine the path for transmitting data between two routers the OSPF protocol is used. In OSPF, each router system 120-125 transmits link state advertisements, which indicate the connections between a particular routing system transmitting the link state advertisement and other router systems. The other router systems 120-125 receive these link state advertisements and store the advertisements in a database. The stored link state advertisements are then used to determine the path used to transmit data between any of the routers using OSPF protocol as is known in the art.

Figure 2:
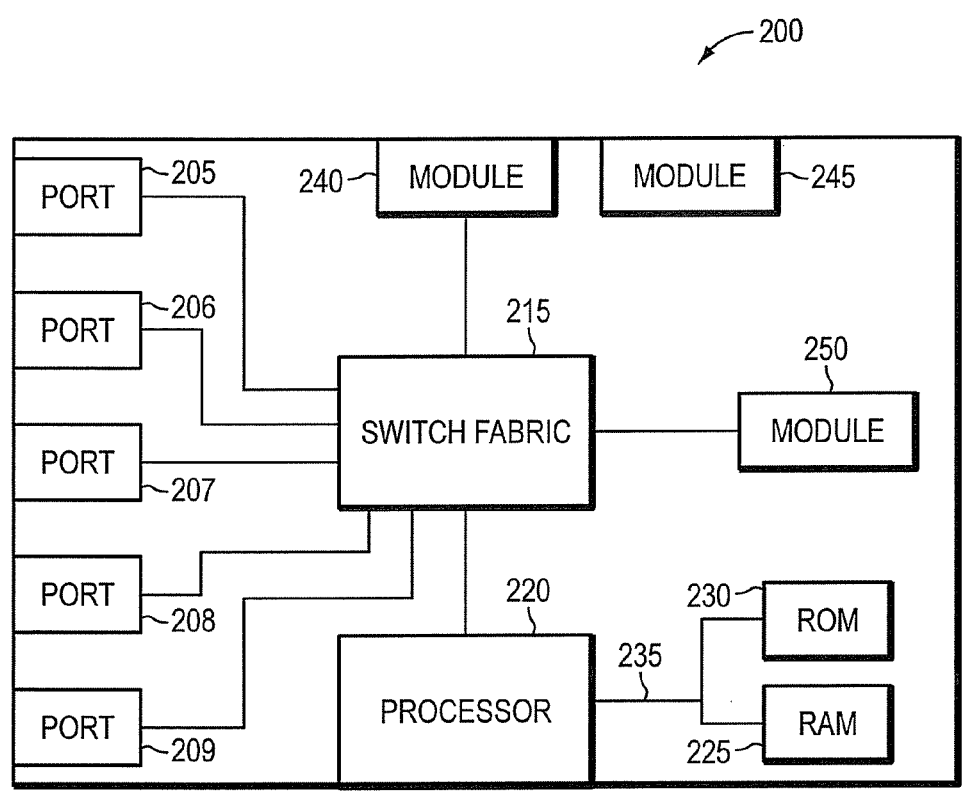
FIG. 2 illustrating a block diagram of a routing system that generates link state identifiers in accordance with the present invention.

FIG. 2 shows a router 200. Router 200 is a switching system that transmits digital data, in the form of packets between processing systems connected to a network. One skilled in the art will recognize that router 200 may be a router, switch or any other processing system that receives and transmits digital data.

Router 200 includes ports 205-209. Ports 205-209 connect router 200 to other processing systems in a network. The other processing systems that may be connected include computers, other routers or any other digital processing systems. One skilled in the art will further recognize that ports 205-209 are shown for exemplary purposes only and the exact number and configuration of the ports are left to one skilled in the art designing a specific router.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in router 200. Processing unit 220 is also connected to a volatile memory 225 and a non-volatile memory 230 via memory bus 235.

Volatile memory 225 is a memory such as a Random Access Memory (RAM). A volatile memory stores instructions and data used by processing unit 220 to perform applications. One such application is a router operating system. The routing operating system is applications which allow router 200 to perform other applications that provide the functions of router 200. An example of the router operating system is Inter-network Operating System (IOS) designed by Cisco Systems Inc. One skilled in the art will recognize that many different types of memory may be used by a non-volatile memory such SRAM and DRAM.

Non-volatile memory 230 is a memory such as a Read Only Memory (ROM). Non-volatile memory 230 stores configuration and other vital information for router 200. One skilled in the art will recognize that there are many different types of memory that may be used as a non-volatile memory.

Modules 240, 245, and 250 are connected to switching circuitry 215. Modules 240, 245, and 250 are device and/or software that prepare specific features in router 200. An example of a module is a Voice Over Internet Protocol (VoIP) module for providing telephonic communications to processing devices connected to router 200. One skilled in the art will recognize that the number of modules and the functions each module provides may be determined by one skilled in the art designing a particular router.

The present invention relates to a method and apparatus for generating a link state identifier for a link state advertisement being sent by a router system. In accordance with this invention, the link state identifier is a unique identifier for link state advertisements of a given type from a router system that performs a start-up while the network is operational. This reduces the need for each router system in the network to flush its database of link state advertisements from the router system performing the start-up in order to prevent disruption of communication between the router systems.

Figure 3:
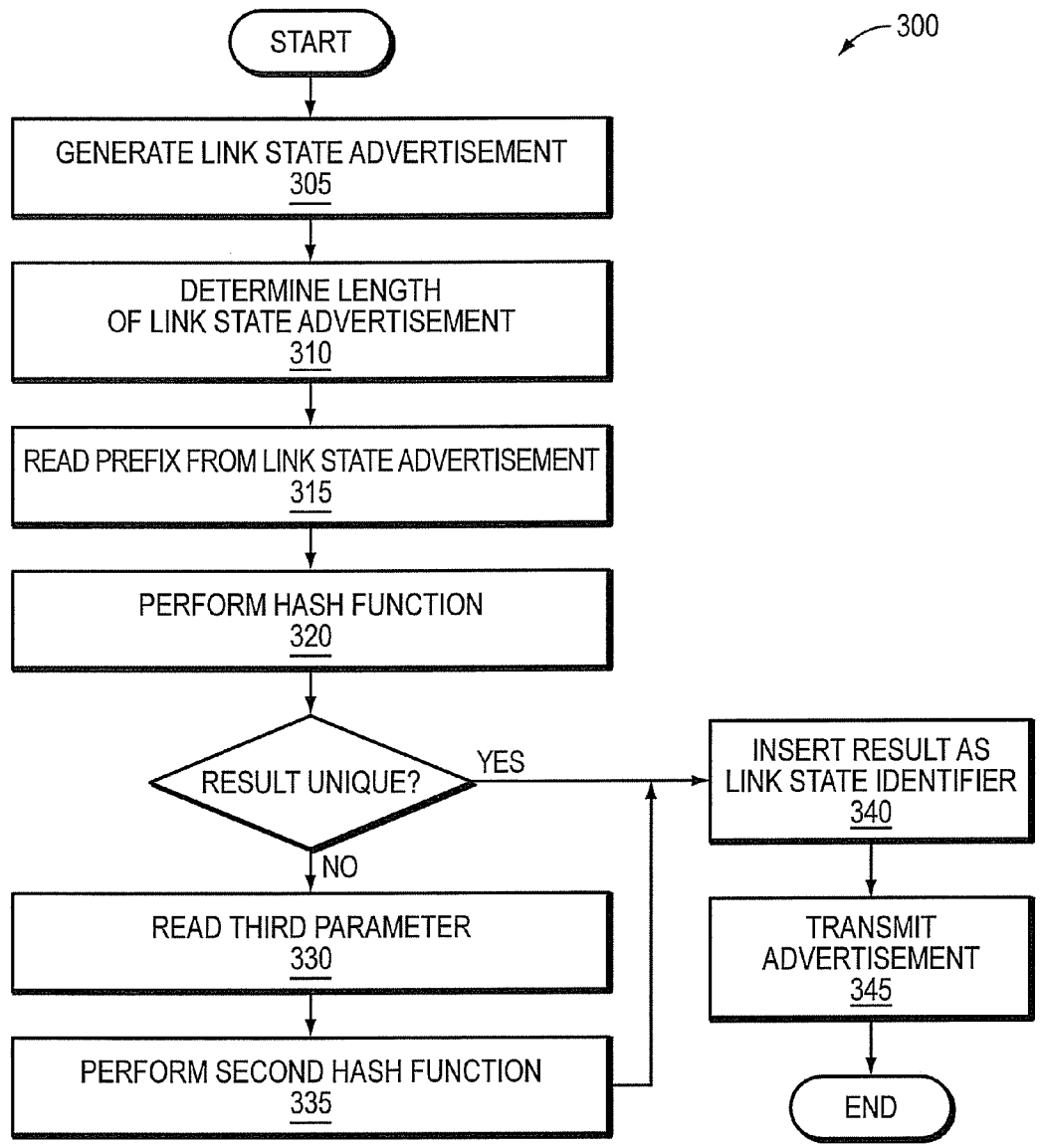
FIG. 3 illustrating a flow diagram of a process for generating a link state advertisement in accordance with the present invention.

FIG. 3 illustrates process 300 that is a preferred exemplary embodiment for generating a link state advertisement with a link state identifier generated in accordance with this invention. Process 300 begins in step 305 with a link state advertisement being generated by the routing system. The link state advertisement is generated in compliance the OSPF protocol as is known in the art. In step 310, the router reads the prefix length contained in the generated link state advertisement. Preferably, the length is an integer value in a range between 0 and 128 indicating the network portion of the preceding Ipv6 address. One skilled in the art will recognize that the length may be determined in other manners and may not be restricted to Ipv6 addresses.

In step 315, a prefix is read from the generated link state advertisement. Preferably, the prefix is a 128-bit Ipv6 address being advertised in the advertisement which is contained in the link state advertisement. One skilled in the art will recognize that the prefix may be determined from other types of addresses and does not have to be used exclusively with Ipv6.

In step 320, a hash function is then performed on the length and the prefix. Preferably, the result of the hash function is no more than 32 bits. Also, the hash function should be chosen that generates minimal collision given different inputs. One skilled in the art will recognize that many such hash functions are described in the available art and an exact function is not given for brevity.

In an exemplary embodiment, the hash function is performed in the following manner. The prefix length is an integer represented by N. The Ipv6 network prefix is converted to a 128 bit binary integer by taking the first N bits of the prefix and appending 128-N zero bits to the end of the first N bits. The 8 bit binary representation of N is then appended to the previously of determined 128 bit binary integer to generate a 136 bit binary integer. The 136 bit binary integer is then input to the well known SHA-1 hash algorithm, and the low-order 31 bits of the resulting value are used as the link state identifier.

In some embodiments, process 300 may proceed directly to step 340. However, in the preferred embodiment of process 300, the router system determines whether the hash function has generated a unique link state identifier in step 325. This may be done by comparing the identifier to stored link state identifiers maintained by the router system.

If the result of the hash function is not a unique link state identifier, process 300 may issue another link state identifier for the advertisement in step 330. In some embodiments, this may be done by using some reserved identifier outside the range of results for the hash functions. In still other embodiments, the new identifier may be determined by applying a second hash function to the prefix and length. The second hash function, in this case should produce results in a different range from the first hash function.

In an exemplary embodiment, a second hash function is performed in the following manner. For purposes of this example, the 31 bit link state identifier computed in step 320 is denoted as H. First, H+1 is computed using 32 bit 2s compliment arithmetic. Then, in the result, set the value of $2^{31}$ in the result to 1. Then repeat this process until a unique link state identifier is generated.

After step 325 or 330, the router system then inserts the unique result into the link state advertisement as the link state identifier in step 340. The link state advertisement is then transmitted in step 345 and process 300 ends.

It is envisioned that one skilled in the art can create a method and apparatus to generate a link state identifier for a link state advertisement from above description of a preferred exemplary embodiment that infringe on this invention as set forth in the following claims either literally or through the Doctrine of Equivalents.

What is claimed is:

1. A method performed by a routing system for generating a link state identifier for a link state advertisement message for transmission over a network, said method comprising:
    generating, by said routing system, said link state advertisement message;
    reading a prefix length of said link state advertisement message;
    reading a prefix of said link state advertisement message;
    performing a hash function on said prefix and said length to produce a result by appending said length to said prefix to generate a combined value, inputting said combined value to a hash algorithm, and using at least a portion of an output of the hash algorithm as said result; and
    using said result of said hash function as said link state identifier.

2. The method of claim 1 wherein said link state identifier is less than or equal to 32-bits in length.

3. The method of claim 1 wherein said prefix is a 128-bit address being advertised.

4. The method of claim 3 wherein said prefix length is a value in a range from 0 to 128 indicating a network portion of said address being advertised.

5. The method of claim 1 further comprising:
    determining whether said result has been used as a link state identifier of a previous link state advertisement and is not unique.

6. The method of claim 5 further comprising:
    in response to said result being not unique, performing a second hash function on said length and said prefix; and
    using said result of said second hash function as said link state identifier.

7. An apparatus in a routing system for generating a link state identifier for a link state advertisement message for transmission over a network, said apparatus comprising:
    means for generating said link state advertisement message;
    means for reading a prefix length of said link state advertisement message;
    means for reading a prefix of said link state advertisement message;
    means for combining said length and said prefix to generate a combined value and inputting said combined value to a hash algorithm that performs a hash function on said combined value to produce a result; and
    means for using said result of said hash function as said link state identifier.

8. The apparatus of claim 7 wherein said link state identifier is less than or equal to 32-bits in length.

9. The apparatus of claim 7 wherein said prefix is a 128-bit address being advertised.

10. The apparatus of claim 8 wherein said length of said prefix address is a value in a range from 0 to 128 indicating a network portion of said address being advertised.

11. The apparatus of claim 7 further comprising:
means for determining whether said result has been used as a link state identifier of a previous link state advertisement and is not unique.

12. The apparatus of claim 11 further comprising:
means for performing a second hash function on said length and said prefix, in response to said result being not unique; and
means for using said result of said second hash function as said link state identifier.

13. A non-transitory computer readable storage medium carrying one or more instructions for generating a link state identifier for a link state advertisement message for transmission over a network, the one more instructions including instructions which, executed by one or more processors, cause the one or more processors to:
generate said link state advertisement message;
read a prefix length of said link state advertisement message;
read a prefix of said link state advertisement message;
combine said length and said prefix to generate a combined value;
input said combined value to a hash algorithm that performs a hash function on said combined value to produce a result; and
use said result of said hash function as said link state identifier.

14. The non-transitory computer readable storage medium of claim 13 wherein said link state identifier is less than or equal to 32-bits in length.

15. The non-transitory computer readable storage medium of claim 13 wherein said prefix is a 128-bit address being advertised.

16. The non-transitory computer readable storage medium of claim 13 wherein said prefix length is a value in a range from 0 to 128 indicating a network portion of said address being advertised.

17. The non-transitory computer readable storage medium of claim 13 wherein the one or more instructions further include instructions which, executed by one or more processors, cause the one or more processors to:
determine whether said result has been used as a link state identifier of a previous link state advertisement and is not unique.

18. The non-transitory computer readable storage medium of claim 17 wherein the one or more instructions further include instructions which, executed by one or more processors, cause the one or more processors to:
perform, in response to said result being not unique, a second hash function on said length and said prefix; and
use said result of said second hash function as said link state identifier.

19. The method of claim 1 further comprising:
inserting said link state identifier in said link state advertisement message.

20. An apparatus comprising:
one or more ports;
a processing unit; and
a memory configured to store instructions for generating a link state identifier for a link state advertisement message, said instructions, when executed by said processing unit, operable to:
read a prefix length of said link state advertisement message,
read a prefix of said link state advertisement message,
combine said prefix length with said prefix to generate a combined value,
input said combined value to a hash algorithm that performs a hash function on said combined value to produce a result,
use said result of said hash function as said link state identifier, and
insert said link state identifier in said link state advertisement message.

21. The apparatus of claim 20 wherein said instructions further comprise instructions, that when executed by said processing unit, are operable to:
determine whether said result has been used as a link state identifier of a previous link state advertisement and is thereby not unique.

22. The apparatus of claim 21 wherein said instructions further comprise instructions, that when executed by said processing unit, are operable to:
in response to determination said result has been used as a link state identifier of a previous link state advertisement and is thereby not unique, perform a second hash function on said combined value to produce a different result, and
use said different result of said second hash function as said link state identifier.

* * * * *